United States Patent [19]
Macur et al.

[11] 3,905,889
[45] Sept. 16, 1975

[54] MINIATURE MULTIFUNCTIONAL ELECTROCHEMICAL SENSOR FOR SIMULTANEOUS CARBON DIOXIDE-pH MEASUREMENTS

[75] Inventors: Robert A. Macur, Milwaukee, Wis.; Oliver H. LeBlanc, Jr.; Willard T. Grubb, both of Schenectady, N.Y.

[73] Assignee: General Electric Company, Schenectady, N.Y.

[22] Filed: Nov. 1, 1974

[21] Appl. No.: 519,798

[52] U.S. Cl.......... 204/195 M; 128/2 E; 204/195 P
[51] Int. Cl...................... G01n 27/30; G01n 27/46
[58] Field of Search........ 204/195 P, 195 M, 195 L, 204/195 R, 1 T; 128/2 E, 2.1 E; 324/29

[56] References Cited
UNITED STATES PATENTS
3,719,576  3/1973  Macur........................... 204/195 P
3,743,588  7/1973  Brown, Jr. et al.............. 204/195 M
3,767,553  10/1973  Brown, Jr. et al.............. 204/195 M

*Primary Examiner*—G. L. Kaplan
*Attorney, Agent, or Firm*—Paul R. Webb, II; Joseph T. Cohen; Jerome C. Squillaro

[57] ABSTRACT

A miniature probe contains a multifunctional electrochemical sensor which measures both the hydrogen ion activity or pH of samples and the carbon dioxide activity of samples. The miniature probe includes a carbon dioxide sensor. When the potential of one electrode in the probe is measured with respect to that of an external reference electrode, a pH sensor is provided.

4 Claims, 1 Drawing Figure

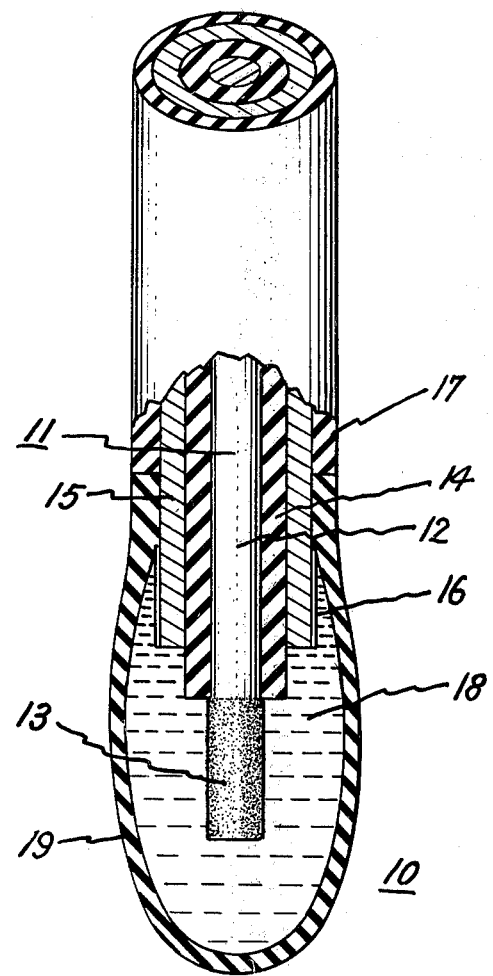

MINIATURE MULTIFUNCTIONAL ELECTROCHEMICAL SENSOR FOR SIMULTANEOUS CARBON DIOXIDE-PH MEASUREMENTS

This invention relates to a miniature probe containing a multifunctional electrochemical sensor and, more particularly, to such a miniature probe containing a carbon dioxide sensor and a pH-sensing electrode.

Cross-references are made to the following patent applications: Ser. No. 519,793, filed concurrently herewith, which application is entitled "Miniature Probe Having Multifunctional Electrodes for Sensing Ions and Gases" in the name of Robert A. Macur; Ser. No. 519,797, filed concurrently herewith, which application is entitled "Miniature Probe Containing Multifunctional Electrochemical Sensing Electrodes" in the names of Leonard W. Niedrach and William H. Stoddard, Jr.; Ser. No. 519,794, filed concurrently herewith which application is entitled "Miniature Probe Containing Multifunctional Electrochemical Sensing Electrodes" in the names of Leonard W. Niedrach and William H. Stoddard, Jr.; Ser. No. 519,796, filed concurrently herewith, which application is entitled "Miniature Probe Containing Multifunctional Electrochemical Electrodes" in the name of John F. Brown, Jr.; and Ser. No. 519,795, filed concurrently herewith, which application is entitled "Miniature Probe Containing Multifunctional Electrochemical Sensing Electrodes" in the names of Leonard W. Niedrach and William H. Stoddard, Jr.

The above five cross-referenced patent applications are assigned to the same assignee as the present application.

Sensors are employed to determine the content of a specific substance in a fluid or atmosphere. For example, a sensor might be employed to determine the content of carbon dioxide in a sample, or its content of hydrogen ions or other ions in solution.

Both pH and carbon dioxide sensors are known, respectively, in the prior art for measuring the hydrogen ion activity or pH of a sample, or for measuring the carbon dioxide current of a sample. A hydrogen ion or pH sensor is described and claimed in U.S. Pat. Nos. 3,671,414, 3,709,810 and 3,719,576. Carbon dioxide sensors are described in U.S. Pat. Nos. 3,673,069, 3,705,088, 3,709,812 and 3,719,576. Methods of manufacturing sensors by successive layers are described in U.S. Pat. No. 3,798,750. All of the above patents are assigned to the same assignee as the present application.

Our present invention is directed to an improved miniaturized multifunctional probe which is suitable for biomedical, environmental control and other applications, and which can be used for in vivo or in vitro analysis.

The primary objectives of our invention are to provide a rugged, miniaturized and multifunctional probe for accurate measurement of both pH and carbon dioxide.

In accordance with one aspect of our invention, a miniature probe contains both a carbon dioxide sensor and a pH-sensing electrode.

These and various other objectives, features and advantages of the invention will be better understood from the following description taken in connection with the accompanying drawing in which:

The single FIGURE is a partial sectional view of a miniature probe containing a $CO_2$ sensor and a pH-sensing electrode made in accordance with our invention.

In the single FIGURE of the drawing there is shown generally at 10 a miniature multifunctional probe comprising a carbon dioxide sensor and a pH electrode made in accordance with our invention. The pH-sensing electrode is shown in the form of flexible, elongated electrode lead 11 which has a base member and an exterior surface 12 of a metal selected from the class consisting of palladium and iridium on the base member. An electrochemically active region 13 adheres tightly to and is in electrical contact with at least a portion of the metal surfaced base member 12 thereby forming a hydrogen ion-selective electrode. Electrochemically active region 13 is selected from the class consisting of the respective oxide of the exterior surface metal. Other coatings showing electrochemical response to pH changes could also be used. A layer 14 of electrical insulation is disposed on the surface of the metal surfaced base member thereby providing a pH electrode.

The carbon dioxide sensor includes the above-described pH electrode. A second electrode lead 15 surrounds at least partially and is spaced from the metal surfaced base member 12. A second electrochemically active region 16 consisting of silver and a silver halide other than fluoride is formed on lead 15 to provide a reference electrode. An electrolyte 17, which is preferably aqueous and immobilized, contacts both electrochemically active regions 13 and 16. An outer sheath 18 of hydrogen ion and carbon dioxide permeable diffusion barrier material encapsulates at least the electrochemically active regions 13 and 16, and electrolyte 17.

We found that we could form the above improved miniature probe by a method of applying successive elements or layers by immersing or dipping the initial metal surfaced member in various aqueous and organic solutions. The application of the successive layers is preferably accomplished by such immersion steps but other suitable means include coating, spraying, brushing, etc. The use of immersion steps is described and claimed in the above referenced U.S. Pat. No. 3,798,750.

The miniature probe of our invention can be formed by employing for the initial support wire a noble metal of palladium or iridium. The first electrochemically active region 13 is palladium oxide or iridium oxide. In the event that a base metal member other than palladium is employed, a layer of palladium or iridium must be deposited on at least the end portion thereof so that the portion can be oxidized. The electrode lead 15 can be silver or of other metals. If a metal other than silver is employed, silver is deposited on at least a portion thereof. The second electrochemically active region, which is applied to the electrode lead 15, is a silver—silver halide except a fluoride.

Various electrical insulating materials are usable and many of such materials can be applied by coating steps. Preferred materials include Viton hexafluoropropylenevinylidene fluoride rubber, Alkanex polyester resin lacquer, silicone rubbers, and epoxy resins, etc. We prefer to employ epoxy resins which provide the desired electrical insulation and which can be applied by coating or dipping. We found specific hydrogen ion and carbon dioxide permeable material was required as an outer sheath to encapsulate the palladium oxide region, at least the silver and silver halide region of the second electrode lead, and the electrolyte. The remainder of the probe is coated with a second layer of electrical insulation. These diffusion barrier materials have an appropriate permeability coefficient for hydrogen ion and carbon dioxide species which are to be sensed. The outer sheath is a membrane made in accordance with U.S. Pat. No. 3,743,588 which is assigned to the same assignee as the present application. This patent and its subject matter are incorporated by reference herein.

With reference to the single FIGURE of the drawing, a miniature probe is formed in accordance with our invention by employing as the electrode lead a 20-mil palladium wire 11, the base or support, upon which the successive elements are applied. An electrochemically active region 13 is formed in electrical contact with wire 11 by roughening a portion at one exposed end of the electrode lead by sand blasting and then applying palladium oxide region. The opposite exposed end (not shown) is provided for subsequently applying an electrical lead thereto. The central portion of the wire is immersed in epoxy resin to apply a first layer of electrical insulation 14 on lead 11. It will be appreciated, of course, that a tube of insulation could be applied over the central portion of the electrode lead by slipping the tube over the lead.

A second electrode lead 15 is formed of silver or other metal and is applied to surround the wire 11 by painting or plating, the silver or the other metal thereon, or a silver tube may be used, or a silver wire may be used. A second active region 16 at one end of the silver or other metal is silver and silver chloride which silver chloride is applied by a chloriding step such as anodization in a chloride solution. If gold is employed, silver is deposited electrochemically and then silver chloride is formed on its surface. A second layer of electrical insulation is applied over second electrode lead 15 except for the chlorided region and for a small region at the upper end for subsequently applying an electrical lead thereto. The lower end of the structure with electrochemically active region 13 is coated with a solution of sodium bicarbonate and sodium chloride with a thickening agent thereby forming an electrolyte 18. Electrolyte 18 is in contact with both regions 13 and 16. A diffusion barrier of a hydrogen ion and carbon dioxide permeable material of a hydrophobic elastomer—polymer with a dielectric constant of from 4 to 13, and a specific ion carrier such as described in U.S. Pat. No. 3,743,588 is then applied as an outer sheath 19 encapsulating the electrically active regions 13 and 16, and electrolyte 18. The pH-sensing electrode is used with a second separate reference electrode such as a silver—silver halide electrode which is immersed in the same sample medium as the probe. The carbon dioxide sensor is self-contained within the miniature probe.

The electrolyte is an aqueous solution, or an aqueous immobilized solution. A suitable aqueous electrolyte is 0.0065 molar bicarbonate and 0.15 molar sodium chloride. The aqueous electrolyte can be immobilized, for example, with a conventional thickening or gelling agent. Such aqueous electrolytes and applications are described in above-mentioned U.S. Pat. No. 3,719,576.

This patent and its subject matter are hereby incorporated by reference.

The resulting device is a miniature probe containing a multifunctional electrochemical sensor. The carbon dioxide sensor, and the pH-sensing electrode of the miniature probe with an external reference electrode can be used for clinical and other analysis. A high impedance electrometer is connected to the electrodes of the probe. In this manner the terminal voltage can be read across the electrodes containing the first active region 13 and the second active material 16. This terminal voltage from electrode leads 11 and 15 in operation will be a function of the carbon dioxide partial pressure in equilibrium with it. The terminal voltage can also be read separately across the electrode lead 11 and the second separate reference electrode. This terminal voltage from the sensor in operation will be a function of the pH.

Examples of miniature probes made in accordance with our invention are as follows:

EXAMPLE 1

A miniature probe sensor was formed in accordance with the above description and as generally shown in the single FIGURE of the drawing. The metal surfaced base member was in the form of a 20-mil palladium wire, one end of which had been coated with palladium oxide. This was accomplished by dipping that end of the wire in 50 weight percent sodium hydroxide in water, heating the wire to 800°C in air for 20 minutes, cooling the wire, rinsing it in distilled water, and drying in air before applying insulation.

The remainder of the metal surfaced base member, with the exception of about one centimeter at the opposite end, was coated first with a thin layer of an alkyd resin paint which was applied to the wire and allowed to dry normally. The paint was Duro porcelain glaze, manufactured by Woodhill Chemical Corporation. A thicker layer of an epoxy resin, Scotchcast 8 epoxy resin manufactured by Minnesota Mining & Manufacturing Corporation, was applied over the dried alkyd resin. The palladium wire was slid into a silver tube until it was positioned properly, and the epoxy resin was allowed to cure normally. A second active region was provided at one end of the silver tube by chloriding in an anodization step. A second layer of insulation of a silicone—polycarbonate block copolymer as described in U.S. Pat. No. 3,189,622 was applied poly(siloxane)-poly(bisphenol-A silver tube except for the chlorided region and for a small region at the upper end for subsequently applying an electrical lead thereto.

The lower end of the structure with the palladium oxide region was coated with an aqueous immobilized electrolyte of 0.0065 molar sodium bicarbonate and 0.15 molar sodium chloride forming an electrolyte contacting both the palladium oxide region and the chlorided portion of the silver tube. A diffusion barrier of a hydrogen and carbon dioxide permeable material is then applied over the electrolyte by dipping the structure wire in a solution of a poly(siloxane)-poly(bisphenol-A) carbonate) block copolymer containing one percent p-octadecycloxy-m-chlorophenylhydrazone mesoxalonitrile in ethylene dichloride. The ethylene dichloride was removed by evaporation at ambient temperature. The resulting polymer film is a specific diffusion barrier.

EXAMPLE 2

The miniature probe sensor formed in Example 1 was tested as follows. It was immersed in an aqueous electrolyte solution containing 0.15 molar sodium chloride and 0.0065 molar sodium bicarbonate at 37° centigrade which could be brought to equilibrium with gases containing various amounts of carbon dioxide in air, ranging between 2 and 10%. The pH of this aqueous electrolyte was a function of the carbon dioxide content of the gas with which it was equilibrated, and in addition the pH of this external solution was changed by adding to it aliquots of a strong acid.

The potential difference at equilibrium between electrode leads 11 and 15 of the miniature probe was measured with a high impedance millivoltmeter. This potential difference, $E_{11}-E_5$, was related to, $PCO_2$, the percentage of carbon dioxide in the gas mixture in equilibrium with the external solution and the probe by the equation:

$$E_{11} - E_{15} = C + S \log PCO_2,$$

where C and S are constants whose numerical values are characteristic of the probe electrodes themselves but independent of the composition of the solution in which the miniature probe is immersed and of the composition of the atmosphere in equilibrium with it.

In addition, a saturated calomel reference electrode was also immersed in the same aqueous electrolyte solution as the probe, and the potential difference between electrode lead 11 of the miniature probe and the saturated calomel electrode was also measured with a high impedance millivoltmeter. This potential difference, $E_{11} - E_{ref}$, was related to $pH_{ext}$, the pH of the external aqueous solution by the equation:

$$E_{11} - E_{ref} = C' + S' \, pH_{ext} + S'' \log PCO_2$$

where $C'$, $S'$, and $S''$ are additional constants whose numerical values are characteristic of the probe electrodes themselves and of the hydrogen ion permeable barrier surrounding the probe but not of the composition of the solution in which the miniature probe is immersed nor of the composition of the atmosphere in equilibrium with it.

Table I sets forth below the results of a sequence of tests in which the potential differences $E_{11} - E_{15}$ and $E_{11} - E_{ref}$ were determined at various known carbon dioxide compositions in the gas mixture in equilibrium with the probe and at various values of the pH of the aqueous solution in which the probe was immersed, these pH values having been determined with a calibrated glass pH electrode.

The various constants $C$, $S$, $C'$, $S'$, and $S''$ described above were determined by a numerical fit of the equations described above to the six data points consisting of the entries in the first two columns and three rows of the Table I; thus, the miniature probe was calibrated. Then, the data in the remaining rows of columns one and two of Table I were used to calculate the values of "$PCO_2$ measured" and "pH measured" shown in the respective rows of columns three and five of Table I, by a numerical simultaneous solution of the two equations described above with values as determined for the constants, $C$, $S$, $C'$, $S'$ and $S''$. The accuracy of these $PCO_2$ and pH values as measured by the miniature probe electrode may be judged by comparing the entries in columns three and five with those in columns four and six, respectively.

TABLE I

| $E_{11}-E_{15}$ | $E_{11}-E_{ref}$ | $PCO_2$ Measured | Actual | pH Measured | Actual |
|---|---|---|---|---|---|
| 232.2 mv | 247.2 mv | (9.98%) | 10.0 | 6.41 | 6.45 |
| 205.4 | 219.0 | (2.00) | 2.0 | (7.14) | 7.14 |
| 205.0 | 241.0 | 1.95 | 2.0 | (6.72) | 6.72 |
| 231.0 | 257.0 | 9.28 | 10.0 | 6.24 | 6.25 |
| 230 | 267 | 8.74 | 10.0 | 6.05 | 5.98 |
| 205 | 265 | 1.95 | 2.0 | 6.26 | 6.14 |
| 205 | 285 | 1.95 | 2.0 | 5.88 | 5.80 |
| 232 | 285 | 9.86 | 10.0 | 5.69 | 5.64 |

The diffusion barrier overlapped the second layer of insulation. The resulting structure was a miniature probe made in accordance with our invention.

While other modifications of the invention and variations thereof which may be embraced within the scope of the invention have not been described, the invention is intended to include such as may be embraced within the following claims.

What we claim as new and desire to secure by Letters Patent of the United States is:

1. A miniature probe containing a hydrogen ion sensing electrode and a carbon dioxide sensor which comprises a flexible, elongated electrode lead, the electrode lead comprising a metallic base member, an electrochemically active region showing electrochemical response to pH changes adhering tightly to and in electrical contact with one end portion of the base member of the electrode lead, and electrical insulation surrounding the base member thereby forming a hydrogen ion sensing electrode; a second metal electrode lead spaced from the base member of the first electrode lead by the electrical insulation thereon, the second electrode containing a region of silver and silver halide other than fluoride thereon, an electrolyte contacting both the electrochemically active region and at least the silver and silver halide region of the second electrode lead, and an outer sheath of a hydrogen ion and carbon dioxide permeable diffusion barrier material encapsulating the electrochemically active region, at least the silver and silver halide region of the second electrode lead, and the electrolyte thereby forming a carbon dioxide sensor, the diffusion barrier material being a hydrophobic elastomer polymer with a dielectric constant of from 4 to 13 containing a hydrophobic and lipophilic H+ ion carrier.

2. A miniature probe as in claim 1, in which the electrochemically active region showing response to pH changes is a metallic oxide selected from the class consisting of palladium oxide and iridium oxide.

3. A miniature probe as in claim 1, in which the electrolyte is an immobilized aqueous solution.

4. A miniature probe as in claim 1, in which the hydrophobic and lipophilic H+ ion carrier is p-octadecyloxy-m-chlorophenylhydrazone mesoxalonitrile.

* * * * *